May 19, 1970 W. WÖLTCHE 3,512,874
WIDE-ANGLE OBJECTIVE OF LARGE BACK-FOCAL LENGTH
Filed Oct. 13, 1967 3 Sheets-Sheet 2

Walter Wöltche
*Inventor.*

By Karl F. Ross
*Attorney*

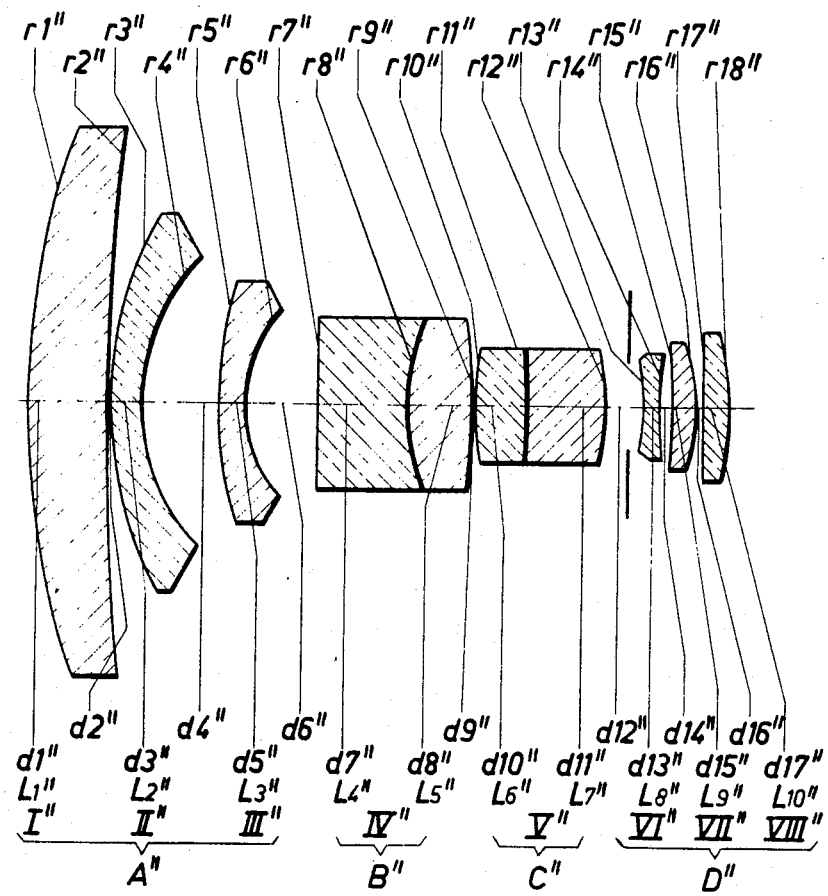

United States Patent Office 3,512,874
Patented May 19, 1970

---

3,512,874
WIDE-ANGLE OBJECTIVE OF LARGE BACK-FOCAL LENGTH
Walter Wöltche, Bad Kreuznach, Germany, assignor to Jos. Schneider & Co., Bad Kreuznach, Germany, a corporation of Germany
Filed Oct. 13, 1967, Ser. No. 675,122
Claims priority, application Germany, Oct. 22, 1966, Sch 39,720
Int. Cl. G02b 27/02
U.S. Cl. 350—214     3 Claims

ABSTRACT OF THE DISCLOSURE

Optical objective composed of 8 lens members, the 2nd, 3rd and 6th member being negatively refracting, the 4th and 5th members each having an axial width greater than that of any other member, the 1st, 2nd, 3rd and 7th members being meniscus-shaped and concave toward a diaphragm space separating the 5th and 6th members, the 6th member being biconcave whereas the 8th member is either biconvex or planoconvex.

---

Figure 1:
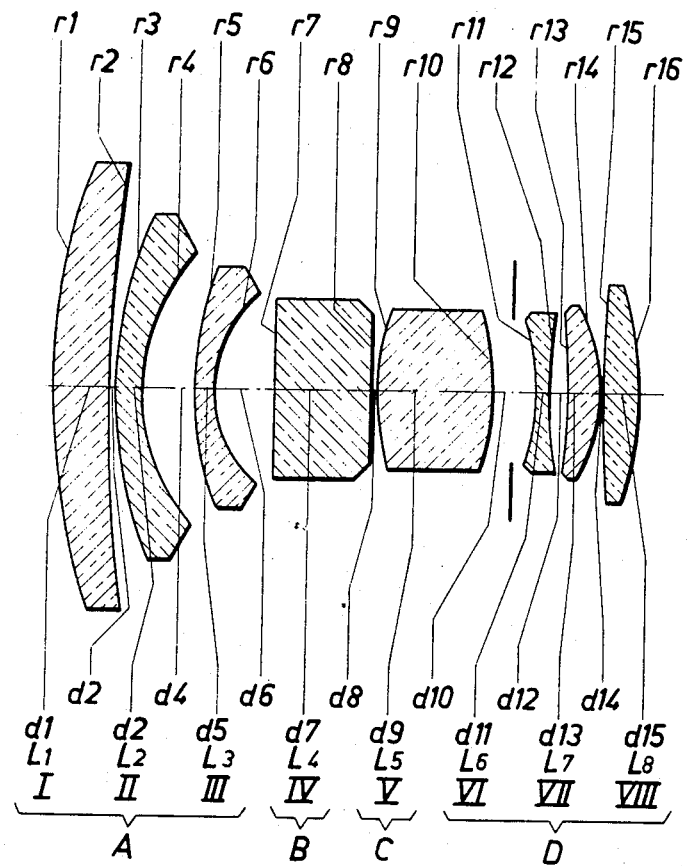

My present invention relates to a wide-angle optical objective for photographic or cinematographic cameras.

In my copending application Ser. No. 619,115, filed Feb. 20, 1967, I have disclosed an objective of this general type with a dispersive front group consisting of two negatively refracting menisci and a collective rear group consisting of two positive members forwardly of a diaphragm space, a biconcave lens beyond that diaphragm space and a biconvex rear lens following the biconcave lens. The system specifically described in that prior application has a relative aperture of 1:4, a back-focal length of approximately 1.3 times the overall focal length, and a field angle of 75°.

The general object of my present invention is to provide an improved system of the type referred to which, with an aperture ratio of 1:4 or better, has a considerably increased back-focal length and a field angle upwardly of 80°.

This object is realized, in accordance with my present invention, by the provision of a front lens in the form of a positive, meniscus ahead of the two negative menisci and by the interposition of another positive meniscus between the biconcave lens and the following rear lens, all the menisci of the system turning their concave sides toward the diaphragm space; in addition, the two positive lens members immediately preceding the diaphragm space are given an axial thickness greater than that of any other lens in the system, with corresponding reduction of the preceding air space which in my prior system amounts to almost 40% of the overall focal length.

The present objective system is thus composed of eight air-spaced lens members whose individual focal lengths have been designated hereinafter by $f_I$ to $f_{VIII}$. I have found that, for best results in terms of suppression of aberrations, these individual focal lengths should be related to the overall focal lengths $f$ substantially as follows:

$$6f < |f_I| < 10f$$
$$2f < |f_{II}| < 3f$$
$$0.9f < |f_{III}| < 1.5f$$
$$6f < |f_{IV}| < 15f$$
$$0.8f < |f_V| < 1.2f$$
$$0.6f < |f_{VI}| < 0.8f$$
$$1.1f < |f_{VII}| < 1.5f$$
$$1.3f < |f_{VIII}| < 2f$$

In somewhat more specific terms, with the individual focal length $f_{III}$ of the third front-side meniscus taken as a reference parameter, the preferred relationship between the absolute value of these individual focal lengths may be expressed as follows:

$$5|f_{III}| < |f_I| < 8|f_{III}|$$
$$1.5|f_{III}| < |f_{II}| < 2.5|f_{III}|$$
$$5|f_{III}| < |f_{IV}| < 12|f_{III}|$$
$$0.7|f_{III}| < |f_V| < |f_{III}|$$
$$0.5|f_{III}| < |f_{VI}| < 0.8|f_{III}|$$
$$|f_{III}| < |f_{VII}| < 1.4|f_{III}|$$
$$1.2|f_{III}| < |f_{VIII}| < 1.7|f_{III}|$$

Of particular significance for the suppression of field curvature is the dimensioning of the axial thicknesses of the positively refracting fourth and fifth lens members immediately preceding the diaphragm space. According to another feature of my invention, these axial thicknesses should exceed not only the individual axial thickness of any other lens member but also the combined axial thicknesses of the first and second lens members as well as the combined axial thicknesses of the three last (image-side) lens members positioned beyond the diaphragm space. The axial thicknesses $d_{IV}$ and $d_V$ of these fourth and fifth members preferably range between substantially 2.5 and 5 times the absolute value of $f_{III}$. The focal length $f_{IV}$ of the positive fourth member preferably exceeds, in absolute terms, that of any other lens member.

Figure 2:
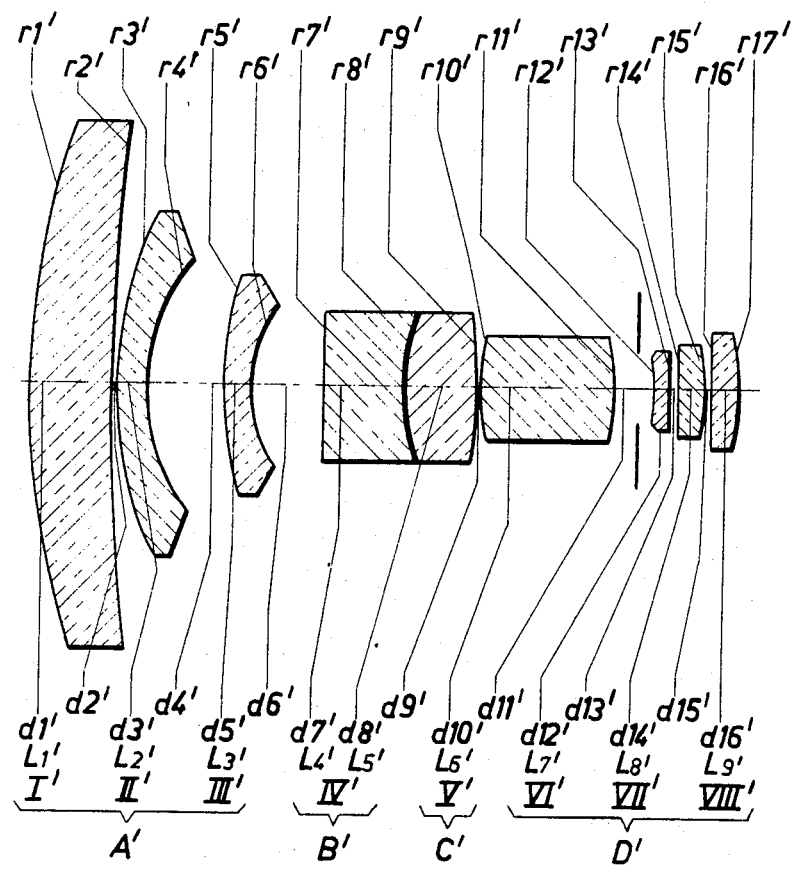

In the accompanying drawing, FIGS. 1, 2 and 3 diagrammatically illustrate three representative embodiments of an objective according to the invention.

The objective shown in FIG. 1 consists of eight singlets I to VIII combined into four distinct components A, B, C and D. Component A consists of a positive meniscus L1 with radii $r1$, $r2$ and thickness $d1$, a negative meniscus L2 with radii $r3$, $r4$ and thickness $d3$ and another negative meniscus L3 with radii $r5$, $r6$ and thickness $d5$; the intervening air spaces have been designated $d2$ and $d4$. The second component B, separated from component A by an air space $d6$, is a planoconvex lens L4 with radii $r7$, $r8$ and thickness $d7$. The third component C, spaced from component B by a distance $d8$, is a biconcave lens L5 with radii $r9$, $r10$ and thickness $d9$. Following a diaphragm space $d10$, there are three more lenses constituting the fourth component D, i.e. a biconcave lens L6 with radii $r11$, $r12$ and thickness $d11$, a positive meniscus L7 with radii $r13$, $r14$ and thickness $d13$, and a biconvex rear lens L8 with radii $r15$, $r16$ and thickness $d15$, the air spaces separating these three lenses having been designated $d12$ and $d14$.

The following Table 1 lists representative numerical values for the radii $r1$ to $r16$ and the thicknesses and separations $d1$ to $d15$ of lens members I to VIII, based on an overall focal length $f$ of 100 linear units (e.g. mm.), together with their refractive indices $n_e$ and Abbe numbers $\nu$, given for a spectral wavelength $\lambda = 546.1$ m$\mu$, as well as the refractive power $\Delta n / r$ for each of the lens surfaces in absolute terms, to be compared with an overall power of $1/f = 0.01$. This system has an aperture ratio of 1:2.8, a back-focal length of 147.38 and a field angle of 80°, suitable for a frame size of 24 x 36 mm.$^2$ when $f=25$ mm.

TABLE 1

| Lens | Radii | Thicknesses and Separations | $n_e$ | $\nu$ | $\Delta n/r$ |
|---|---|---|---|---|---|
| L1 | r1=+242.39 | d1=19.52 | 1.62287 | 60.06 | +0.002570 |
|  | r2=+598.84 | d2=0.39 | Air space | | −0.001040 |
| L2 | r3=+146.20 | d3=9.76 | 1.62287 | 60.06 | +0.004260 |
|  | r4=+71.05 | d4=19.52 | Air space | | −0.008767 |
| L3 | r5=+115.32 | d5=5.86 | 1.62287 | 60.06 | +0.005401 |
|  | r6=+43.57 | d6=21.47 | Air space | | −0.014296 |
| L4 | r7=∞ | d7=35.13 | 1.69416 | 30.93 | 0.000000 |
|  | r8=−468.54 | d8=0.78 | Air space | | +0.001482 |
| L5 | r9=+96.39 | d9=40.99 | 1.58564 | 46.22 | +0.006076 |
|  | r10=−96.39 | d10=14.83 | Diaphragm space | | +0.006076 |
| L6 | r11=−77.45 | d11=4.68 | 1.76167 | 27.34 | −0.009834 |
|  | r12=+168.88 | d12=5.47 | Air space | | −0.004510 |
| L7 | r13=−244.14 | d13=11.71 | 1.62287 | 60.06 | −0.002551 |
|  | r14=−61.95 | d14=0.39 | Air space | | +0.010054 |
| L8 | r15=+585.88 | d15=11.71 | 1.62287 | 60.06 | +0.001063 |
|  | r16=−125.08 | | | | +0.004980 |

FIG. 2 shows a similar system whose four components A′, B′, C′ and D′ consist again of eight lens members I′ to VIII′ constituted in this case by nine individual lenses L1′ to L9′; their radii have been designated r1′ to r17′ while their thicknesses and separations are indicated at d1′ to d16′.

In contradistinction of the system to FIG. 1, the objective of FIG. 2 includes a doublet L4′, L5′ in the position of the fourth lens member IV′. The cemented surface r8′ of this doublet is negatively refracting and forwardly convex; in addition to reducing chromatic aberrations, the use of this doublet further improves the quality of the projected image as expressed in an increased field angle. Representative numerical values for the parameters of FIG. 2 are given in the following Table 2. This system has a relative aperture of 1:4, a back-focal length of 174.79 and a field angle of 90°.

TABLE 2

| Lens | Radii | Thicknesses and Separations | $n_e$ | $\nu$ | $\Delta n/r$ |
|---|---|---|---|---|---|
| L1′ | r1′=+290.88 | d1′=27.91 | 1.57086 | 63.01 | +0.001962 |
|  | r2′=+791.16 | d2′=0.47 | Air space | | −0.000721 |
| L2′ | r3′=+139.49 | d3′=10.23 | 1.62287 | 60.06 | +0.004465 |
|  | r4′=+72.60 | d4′=27.91 | Air space | | −0.008579 |
| L3′ | r5′=+148.09 | d5′=8.37 | 1.66104 | 57.08 | +0.004464 |
|  | r6′=+48.74 | d6′=25.58 | Air space | | −0.013563 |
| L4′ | r7′=∞ | d7′=27.91 | 1.62287 | 60.06 | 0.000000 |
| L5′ | r8′=+82.19 | d8′=25.12 | 1.55098 | 45.61 | −0.000875 |
|  | r9′=−277.07 | d9′=0.93 | Air space | | +0.001989 |
| L6′ | r10′=+109.35 | d10′=46.51 | 1.55098 | 45.61 | +0.005039 |
|  | r11′=−100.14 | d11′=13.95 | Diaphragm space | | +0.005502 |
| L7′ | r12′=−73.30 | d12′=5.12 | 1.74703 | 27.82 | −0.010191 |
|  | r13′=+219.16 | d13′=3.26 | Air space | | −0.003409 |
| L8′ | r14′=−318.65 | d14′=9.30 | 1.62287 | 60.06 | −0.001955 |
|  | r15′=−68.14 | d15′=0.47 | Air space | | +0.009141 |
| L9′ | r16′=∞ | d16′=9.30 | 1.62287 | 60.06 | 0.000000 |
|  | r17′=−105.26 | | | | +0.005917 |

The system of FIG. 3 differs from that of FIG. 2 by the presence of a further doublet in the position of the fifth lens member V″; its eight lens members I″ to VIII″, constituting the four components A″, B″, C″ and D″, thus consist of 10 individual lenses L1″ to L10″ whose radii and thicknesses and separations have been respectively designated r1″ to r18″ and d1″ to d17″.

The cemented surface r11″ of double V″ is rearwardly convex and positively refracting, as are its two constituent lenses L6″ and L7″. The presence of this second cemented surface is particularly effective in suppressing higher-order entrance-pupil and asymmetrical aberrations.

Representative numerical values for the parameters of the system of FIG. 3 are listed in the following Table 3. This objective has the same aperture ratio and field angle as that of Table 2 and a back-focal length of 173.92; both systems are suitable for a frame size of 24 x 36 mm." with $f=21$ mm.

TABLE 3

| Lens | Radii | Thicknesses and Separations | $n_e$ | $\nu$ | $\Delta n/r$ |
|---|---|---|---|---|---|
| L1″ | r1″=+285.31 | d1″=27.68 | 1.52736 | 64.31 | +0.001848 |
|  | r2″=+887.45 | d2″=0.46 | Air space | | −0.000594 |
| L2″ | r3″=+138.37 | d3″=10.15 | 1.62287 | 60.06 | +0.004501 |
|  | r4″=+72.02 | d4″=27.68 | Air space | | −0.008649 |
| L3″ | r5″=+146.90 | d5″=8.30 | 1.66104 | 57.08 | +0.004500 |
|  | r6″=+48.35 | d6″=25.38 | Air space | | −0.013672 |
| L4″ | r7″=∞ | d7″=32.30 | 1.62287 | 60.06 | 0.000000 |
| L5″ | r8″=+81.52 | d8″=20.30 | 1.53530 | 45.67 | −0.001074 |
|  | r9″=−274.84 | d9″=0.92 | Air space | | +0.001948 |
| L6″ | r10″=+112.07 | d10″=18.54 | 1.61114 | 45.92 | +0.005453 |
| L7″ | r11″=−346.45 | d11″=26.76 | 1.53430 | 48.66 | +0.000222 |
|  | r12″=−100.72 | d12″=13.84 | Diaphragm space | | +0.005305 |
| L8″ | r13″=−72.25 | d13″=5.08 | 1.74618 | 27.97 | −0.010328 |
|  | r14″=+216.52 | d14″=3.23 | Air space | | −0.003446 |
| L9″ | r15″=+259.71 | d15″=9.23 | 1.62287 | 60.06 | −0.002398 |
|  | r16″=−65.93 | d16″=0.46 | Air space | | +0.009447 |
| L10″ | r17″=∞ | d17″=9.23 | 1.59142 | 61.03 | 0.000000 |
|  | r18″=−97.77 | | | | +0.006049 |

The numerical values of the foregoing tables are to be understood as valid within tolerance limits of substantially ±10% for the radii, thicknesses and separations, the surface powers and the Abbe numbers, and of substantially ±0.02 for the refractive indices. In view of these tolerances, the last three digits in the $n_e$ column and the decimals in the other columns are only of minor significance.

It will be observed that the two last components C, C′, C″ and D, D′, D″ of my improved objective do not exhibit any dispersive internal surfaces which in prior-art objectives are responsible for appreciable spherical aberrations and chromatic divergences of the entrance-pupil (Gaussian) aberration.

The following Table 4 summarizes the individual focal lengths of the eight lens members of each of the three aforedescribed objective systems.

TABLE 4

|  | Table 1 | Table 2 | Table 3 |
|---|---|---|---|
| $f_I$ | +640.3 | +789.8 | +784.9 |
| $f_{II}$ | −233.6 | −258.2 | −256.2 |
| $f_{III}$ | −116.1 | −113.7 | −112.8 |
| $f_{IV}$ | +675.0 | +875.6 | +1109.7 |
| $f_V$ | +89.3 | +103.0 | +98.9 |
| $f_{VI}$ | −69.1 | −73.0 | −72.1 |
| $f_{VII}$ | +130.1 | +137.2 | +139.3 |
| $f_{VIII}$ | +166.5 | +169.0 | +165.3 |

It will thus be seen that each of the three systems specifically described hereinabove satisfies the aforestated relationships of the individual focal lengths with one another and with the axial thicknesses of the two intermediate positive lens members.

I claim:

1. An eight-member optical objective consisting of a positive first singlet L1, a negative second singlet L2, a negative third singlet L3, a positive fourth singlet L4, a positive fifth singlet L5, a negative sixth singlet L6, a positive seventh singlet L7 and a positive eighth singlet L8, the numerical values of the radii $r1$ to $r16$ and the thicknesses and separations $d1$ to $d15$ of said singlets L1 to L8, based upon an overall focal length of numerical value 100, their refractive indices $n_e$ and their Abbe numbers $\nu$, for a wavelength $\lambda=546.1$ m$\mu$, being substantially as given in the following table:

| Lens | Radii | Thicknesses and Separations | $n_e$ | $\nu$ |
|---|---|---|---|---|
| L1 | r1=+242.39 | d1=19.52 | 1.62 | 60.06 |
|  | r2=+598.84 | d2=0.39 | Air space | |
| L2 | r3=+146.20 | d3=9.76 | 1.62 | 60.06 |
|  | r4=+71.05 | d4=19.52 | Air space | |
| L3 | r5=+115.32 | d5=5.86 | 1.62 | 60.06 |
|  | r6=+43.57 | d6=21.47 | Air space | |
| L4 | r7=∞ | d7=35.13 | 1.69 | 30.92 |
|  | r8=−468.54 | d8=0.78 | Air space | |
| L5 | r9=+96.39 | d9=40.99 | 1.59 | 46.22 |
|  | r10=−96.39 | d10=14.83 | Diaphragm space | |
| L6 | r11=−77.45 | d11=4.68 | 1.76 | 27.34 |
|  | r12=+168.88 | d12=5.47 | Air space | |
| L7 | r13=−244.14 | d13=11.71 | 1.62 | 60.06 |
|  | r14=−61.95 | d14=0.39 | Air space | |
| L8 | r15=+585.88 | d15=11.71 | 1.62 | 60.06 |
|  | r16=−125.08 | | | |

2. An eight-member optical objective consisting of a positive first lens member, a negative second lens member, a negative third lens member, a positive fourth lens member, a positive fifth lens member, a negative sixth lens member, a positive seventh lens member and a positive eighth lens member, said fourth lens member being a doublet consisting of a negative first lens and a positive second lens separated by a negatively refracting cemented surface, the remaining lens members being all singlets, the numerical values of the radii $r1'$ to $r17'$ and the thicknesses and separations $d1'$ to $d16'$ of said singlets L1' to L3', L6' to L9', said first lens L4' and said second lens L5', based upon an overall focal length of numerical value 100, their refracted indices $n_e$ and their Abbe numbers $\nu$, for a wavelength $\lambda=546.1$ m$\mu$, being substantially as given in the following table:

| Lens | Radii | Thicknesses and Separations | $n_e$ | $\nu$ |
|---|---|---|---|---|
| L1' | r1'=+290.88 | d1'=27.91 | 1.57 | 63.01 |
|  | r2'=+791.16 | d2'=0.47 | Air space | |
| L2' | r3'=+139.49 | d3'=10.23 | 1.62 | 60.06 |
|  | r4'=+72.60 | d4'=27.91 | Air space | |
| L3' | r5'=+148.09 | d5'=8.37 | 1.66 | 57.08 |
|  | r6'=−48.74 | d6'=25.58 | Air space | |
| L4' | r7'=∞ | d7'=27.91 | 1.62 | 60.06 |
| L5' | r8'=+82.19 | d8'=25.12 | 1.55 | 45.61 |
|  | r9'=−277.07 | d9'=0.93 | Air space | |
| L6' | r10'=+109.35 | d10'=46.51 | 1.55 | 45.61 |
|  | r11'=−100.14 | d11'=13.95 | Diaphragm space | |
| L7' | r12'=−73.30 | d12'=5.12 | 1.75 | 27.82 |
|  | r13'=+219.16 | d13'=3.26 | Air space | |
| L8' | r14'=−318.65 | d14'=9.30 | 1.62 | 60.06 |
|  | r15'=−68.14 | d15'=0.47 | Air space | |
| L9' | r16'=∞ | d16'=9.30 | 1.62 | 60.06 |
|  | r17'=−105.26 | | | |

3. An eight-member optical objective consisting of a positive first lens member, a negative second lens member, a negative third lens member, a positive fourth lens member, a positive fifth lens member, a negative sixth lens member, a positive seventh lens member and a positive eighth lens member, said fourth lens member being a doublet composed of a negative first lens and a positive second lens separated by a negatively refracting forwardly convex cemented surface, said fifth lens member being a doublet composed of a positive third lens and a positive fourth lens separated by a positively refracting rearwardly convex cemented surface, the other of said lens members being all singlets, the numerical values of the radii $r1''$ to $r18''$ and the thicknesses and separations $d1''$ to $d17''$ of said singlets L1'' to L3'', L8'' to L10'', said first lens L4'', said second lens L5'', said third lens L6'' and said fourth lens L7'', based upon an overall focal length of numerical value 100, their refracted indices $n_e$ and their Abbe numbers $\nu$, for a wavelength $\lambda = 546.1$ m$\mu$, being substantially as given in the following table:

| Lens | Radii | Thicknesses and Separations | $n_e$ | $\nu$ |
|---|---|---|---|---|
| L1″ | $r1'' = +285.31$ | $d1'' = 27.68$ | 1.53 | 64.31 |
|  | $r2'' = +887.45$ | $d2'' = 0.46$ | Air space | |
| L2″ | $r3'' = +138.37$ | $d3'' = 10.15$ | 1.62 | 60.06 |
|  | $r4'' = +72.02$ | $d4'' = 27.68$ | Air space | |
| L3″ | $r5'' = +146.90$ | $d5'' = 8.30$ | 1.66 | 57.08 |
|  | $r6'' = +48.35$ | $d6'' = 25.38$ | Air space | |
| L4″ | $r7'' = \infty$ | $d7'' = 32.30$ | 1.62 | 60.06 |
| L5″ | $r8'' = +81.52$ | $d8'' = 20.30$ | 1.54 | 45.67 |
|  | $r9'' = -274.84$ | $d9'' = 0.92$ | Air space | |
| L6″ | $r10'' = +112.07$ | $d10'' = 18.45$ | 1.61 | 45.92 |
| L7″ | $r11'' = -346.45$ | $d11'' = 26.76$ | 1.53 | 48.66 |
|  | $r12'' = -100.72$ | $d12'' = 13.84$ | Diaphragm space | |
| L8″ | $r13'' = -72.25$ | $d13'' = 5.08$ | 1.75 | 27.97 |
|  | $r14'' = +216.52$ | $d14'' = 3.23$ | Air space | |
| L9″ | $r15'' = -259.71$ | $d15'' = 9.23$ | 1.62 | 60.06 |
|  | $r16'' = -65.93$ | $d16'' = 0.46$ | Air space | |
| L10″ | $r17'' = \infty$ | $d17'' = 9.23$ | 1.59 | 61.03 |
|  | $r18'' = -97.77$ | | | |

References Cited

UNITED STATES PATENTS

| 2,050,024 | 8/1936 | Sonnefeld | 350—214 |
| 2,549,159 | 4/1951 | Bertele | 350—216 |

FOREIGN PATENTS

| 46,553 | 3/1966 | Germany. |
| Ad. 83,412 | 6/1964 | France. |

DAVID SCHONBERG, Primary Examiner

P. A. SACHER, Assistant Examiner